(12) United States Patent
Zhao et al.

(10) Patent No.: US 12,526,327 B2
(45) Date of Patent: Jan. 13, 2026

(54) METHOD FOR REMOTE CONSULTATION AND RELATED APPARATUS

(71) Applicant: BOE TECHNOLOGY GROUP CO., LTD., Beijing (CN)

(72) Inventors: Zhenyan Zhao, Beijing (CN); Hongyun Man, Beijing (CN); Linyi Fan, Beijing (CN); Jie Wang, Beijing (CN); Lei Shao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 763 days.

(21) Appl. No.: 16/976,923

(22) PCT Filed: Dec. 2, 2019

(86) PCT No.: PCT/CN2019/122359
§ 371 (c)(1),
(2) Date: Jan. 6, 2023

(87) PCT Pub. No.: WO2021/108948
PCT Pub. Date: Jun. 10, 2021

(65) Prior Publication Data
US 2022/0385702 A1   Dec. 1, 2022
US 2023/0164200 A2   May 25, 2023

(51) Int. Cl.
*H04L 65/403*   (2022.01)
(52) U.S. Cl.
CPC .................. *H04L 65/403* (2013.01)
(58) Field of Classification Search
CPC ............... H04L 65/403; H04L 65/1059; H04L 65/1069; H04L 65/1073; G16H 80/00
See application file for complete search history.

(56) References Cited

U.S. PATENT DOCUMENTS

| | | | |
|---|---|---|---|
| 2013/0110537 A1 | 5/2013 | Smith | |
| 2014/0078240 A1 | 3/2014 | Yang | |
| 2018/0247029 A1* | 8/2018 | Fish | A61K 45/06 |
| 2020/0351110 A1 | 11/2020 | Yang et al. | |
| 2020/0358628 A1* | 11/2020 | Achyuth | H04M 3/568 |
| 2020/0359893 A1* | 11/2020 | Rollins | G06F 3/04886 |

(Continued)

FOREIGN PATENT DOCUMENTS

| | | |
|---|---|---|
| CN | 102439973 A | 5/2012 |
| CN | 202306552 U | 7/2012 |
| CN | 204408490 U | 6/2015 |

(Continued)

OTHER PUBLICATIONS

International Search Report and Written Opinion mailed on Aug. 26, 2020 for PCT Application No. PCT/CN2019/122359.

(Continued)

*Primary Examiner* — Nicholas R Taylor
*Assistant Examiner* — Tania M Pena-Santana
(74) *Attorney, Agent, or Firm* — Raj S. Dave; Dave Law Group LLC

(57) ABSTRACT

Embodiments of the present disclosure provide a method for a remote consultation. The method includes: receiving control information for controlling a consultation device; and sending the control information to a consultation server, such that the consultation server controls the consultation device based on the control information.

13 Claims, 11 Drawing Sheets

(56) References Cited

U.S. PATENT DOCUMENTS

2020/0402674 A1\* 12/2020 DeBates ................. H04N 7/14

FOREIGN PATENT DOCUMENTS

| | | |
|---|---|---|
| CN | 102938834 B | 4/2016 |
| CN | 106295107 A | 1/2017 |
| CN | 106550146 A | 3/2017 |
| CN | 107845421 A | 3/2018 |
| CN | 108269619 A | 7/2018 |
| CN | 108511054 A | 9/2018 |
| CN | 107707947 B | 9/2020 |
| CN | 108965217 B | 10/2020 |
| WO | 2019196636 A1 | 10/2019 |

OTHER PUBLICATIONS

Search report issued for CN Application No. 201980002753.7, 2 pages.
Office action issued for CN Application No. 201980002753.7, mailed on May 27, 2024, 15 pages.

\* cited by examiner

FIG.8

METHOD FOR REMOTE CONSULTATION AND RELATED APPARATUS

CROSS REFERENCE TO RELATED APPLICATIONS

This patent application is a National Stage Entry of PCT/CN2019/122359 filed on Dec. 2, 2019, the disclosure of which is incorporated by reference herein in its entirety as part of the present application.

TECHNICAL FIELD

The present disclosure relates to the medical field, and particularly to a method and a related apparatus for remote consultation and an interaction method.

BACKGROUND

In recent years, a telemedicine has developed rapidly, and a remote consultation has been widely used as a technical means that can allocate medical resources more reasonably. With the progress of the Internet technology, the remote consultation has gradually changed from relying on a fax and a telephone, etc., to an Internet-based remote conference system for a real-time face-to-face consultation.

In addition, the development of the Internet technology has realized a hospital system that can digitally collect, store, process, extract, and send patient diagnosis and treatment information and administrative management information.

SUMMARY

Embodiments of the present disclosure provide the method for remote consultation, a consultation management terminal, a consultation server, a computer-readable storage medium with computer programs stored thereon and an interaction method.

A first aspect of the present disclosure provides the method for remote consultation. The method includes receiving control information for controlling a consultation device, and sending the control information to a consultation server, such that the consultation server controls the consultation device based on the control information.

In an embodiment of the present disclosure, the consultation device may include a reproduction apparatus for reproducing multimedia data, and controlling the consultation device may include at least one of controlling a reproduction content of the reproduction apparatus, and controlling a reproduction parameter of the reproduction apparatus.

In an embodiment of the present disclosure, the reproduction parameter may include at least one of a split screen layout, brightness, contrast, and volume.

In an embodiment of the present disclosure, the split screen layout may include a number of the split screens, a size of the split screen, and a relative position of the split screen.

In an embodiment of the present disclosure, controlling the reproduction content of the reproduction apparatus may include independently controlling a display content of respective split screens.

In an embodiment of the present disclosure, the consultation device may further include an imaging apparatus and a sound acquiring apparatus, and controlling the consultation device may include at least one of: adjusting an imaging direction of the imaging apparatus; adjusting an imaging focal length of the imaging apparatus; and enabling or disabling the sound acquiring apparatus.

In an embodiment of the present disclosure, receiving control information for controlling the consultation device may include acquiring the control information via a user interface.

In an embodiment of the present disclosure, the method may further include receiving consultation information from the consultation server, and displaying the consultation information.

In an embodiment of the present disclosure, the consultation information may include at least one of: status data of the consultation device, consultation data, doctor data and patient data.

In an embodiment of the present disclosure, the method may further include sending a consultation request to the consultation server. The said consultation server may be configured to establish a consultation space based on the consultation request and send information of establishing the consultation space to the consultation device. The consultation device may be configured to log in the consultation space in response to the information of establishing the consultation space. The consultation server may be configured to log in the consultation space in response to the consultation device, and the consultation server may be further configured to send information of successfully establishing the consultation in response to the consultation device logging in the consultation space. The method may further include: receiving the information of successfully establishing the consultation from the consultation server, and notifying a user of starting the consultation in response to the received information of successfully establishing the consultation.

In an embodiment of the present disclosure, the method may further include at least one of the following consultation operations: user registration, user login, user right management, and user information editing.

In an embodiment of the present disclosure, the consultation device may include a local consultation device and a remote consultation device. The method may further include sending initialization configuration information to the local consultation device to initialize the local consultation device.

A second aspect of the present disclosure provides the consultation management terminal. The consultation management terminal includes: a processor; and a memory with computer programs stored therein. The computer program, when executed by the processor, causes the consultation management terminal to implement the method according to the first aspect of the present disclosure.

A third aspect of the present disclosure provides the computer-readable storage medium having computer programs stored thereon. The computer program, when executed by a processor, implements the method according to the first aspect of the present disclosure.

A fourth aspect of the present disclosure provide a method for remote consultation. The method includes receiving control information for controlling the consultation device from a consultation management terminal, and controlling the consultation device based on the control information.

In an embodiment of the present disclosure, the consultation device may include a reproduction apparatus for reproducing multimedia data, and controlling the consultation device may include at least one of controlling a reproduction content of the reproduction apparatus, and controlling a reproduction parameter of the reproduction apparatus.

In an embodiment of the present disclosure, the reproduction parameter may include at least one of: a split screen layout, brightness, contrast, and volume.

In an embodiment of the present disclosure, wherein the split screen layout may include a number of the split screen, a size of the split screen and a relative position of the split screen.

In an embodiment of the present disclosure, controlling the reproduction content of the reproduction apparatus may include controlling the display content of respective split screens, independently.

In an embodiment of the present disclosure, the consultation device may further include an imaging apparatus and a sound acquiring apparatus, and controlling the consultation device may include at least one of adjusting an imaging direction of the imaging apparatus, adjusting an imaging focal length of the imaging apparatus, and enabling or disabling the sound acquiring apparatus.

In an embodiment of the present disclosure, the method may further include establishing a consultation task, receiving, from the consultation management terminal, a consultation request corresponding to the consultation task, establishing a consultation space based on the consultation request; sending information of establishing the consultation space to the consultation device, such that the consultation device logs in the consultation space, and in response to that the consultation device logs into the consultation space, and sending, in response to the consultation device logging in the consultation space, information of successfully establishing the consultation to the consultation management terminal to start the consultation.

In an embodiment of the present disclosure, in the method, establishing the consultation task may include establishing the consultation task via a control server. Receiving the consultation request corresponding to the consultation task from the consultation management terminal may include receiving the consultation request from the consultation management terminal via the control server. sending the information of establishing the consultation space to the consultation device may include controlling, in response to the consultation request, the media server to establish the consultation space via the control server, and sending, in response to establishing the consultation space, information of establishing the consultation space to the consultation device via the control server. Sending, in response to the consultation device logging in the consultation space, information of successfully establishing the consultation to the consultation management terminal to start the consultation may include sending, in response to the consultation device logging in the consultation space, the information of successfully establishing the consultation to the consultation management terminal using the control server.

A fifth aspect of the present disclosure provide a consultation server. The consultation server includes: a processor; and a memory with computer programs stored therein. The computer programs, when executed by the processor, causes the consultation server to implement the method according to the fourth aspect of the present disclosure.

A sixth aspect of the present disclosure provides a computer-readable storage medium with computer programs stored thereon. The computer programs, when executed by a processor, implements the method according to the fourth aspect of the present disclosure.

A seventh aspect of the present disclosure provides the interaction method. The method includes displaying a user interface, wherein the user interface includes an icon of a video source corresponding to the video source and an icon of a display screen corresponding to a display screen of a consultation device, and displaying, in response to a user operation on the icon of the video source, corresponding information of the video source on the icon of the display screen related to the user operation.

In an embodiment of the present disclosure, the icon of display screen may include an icon of a split screen layout.

In an embodiment of the present disclosure, the icon of split screen layout may include at least one of: an icon of a full-screen layout, an icon of a picture-in-picture layout, an icon of a two-split-screen layout, an icon of a three-split-screen layout, and an icon of a four-split-screen layout.

In an embodiment of the present disclosure, the information of the video source may include a description of the video source.

In an embodiment of the present disclosure, the user operation may include dragging the icon of the video source to a screen area corresponding to the icon of the split screen layout.

In an embodiment of the present disclosure, the user interface may further include an icon of a text information interaction, and the consultation device may include a display screen corresponding to the icon of the display screen and an additional display screen not corresponding to the icon of the display screen, the method may further include displaying, in response to an operation of selecting the icon of the text information interaction by a user, a pop-up window, wherein the pop-up window has preset text information, and sending, in response to selecting the preset text information in the pop-up window by the user, the selected preset text information to the additional display screen of the consultation device.

In an embodiment of the present disclosure, the user interface may further include an icon of video sharing, the method may further include: displaying, in response to selecting the icon of video sharing by a user, a pop-up window, wherein the pop-up window has an option corresponding to the video source, and displaying, in response to selecting the option in the pop-up window by the user, the selected video source on all of the consultation devices.

BRIEF DESCRIPTION OF THE DRAWINGS

In order to illustrate the technical solutions of embodiments of the present disclosure more clearly, drawings of the embodiments will be briefly described below. It should be appreciated that the drawings described below only relate to some embodiments of the present disclosure, rather than limiting the present disclosure, wherein throughout each of these drawings the same reference numerals indicate the same parts or features:

FIG. 8 shows an interface of consultation details of the consultation management terminal according to an embodiment of the present disclosure;

DETAILED DESCRIPTION

Figure 1:
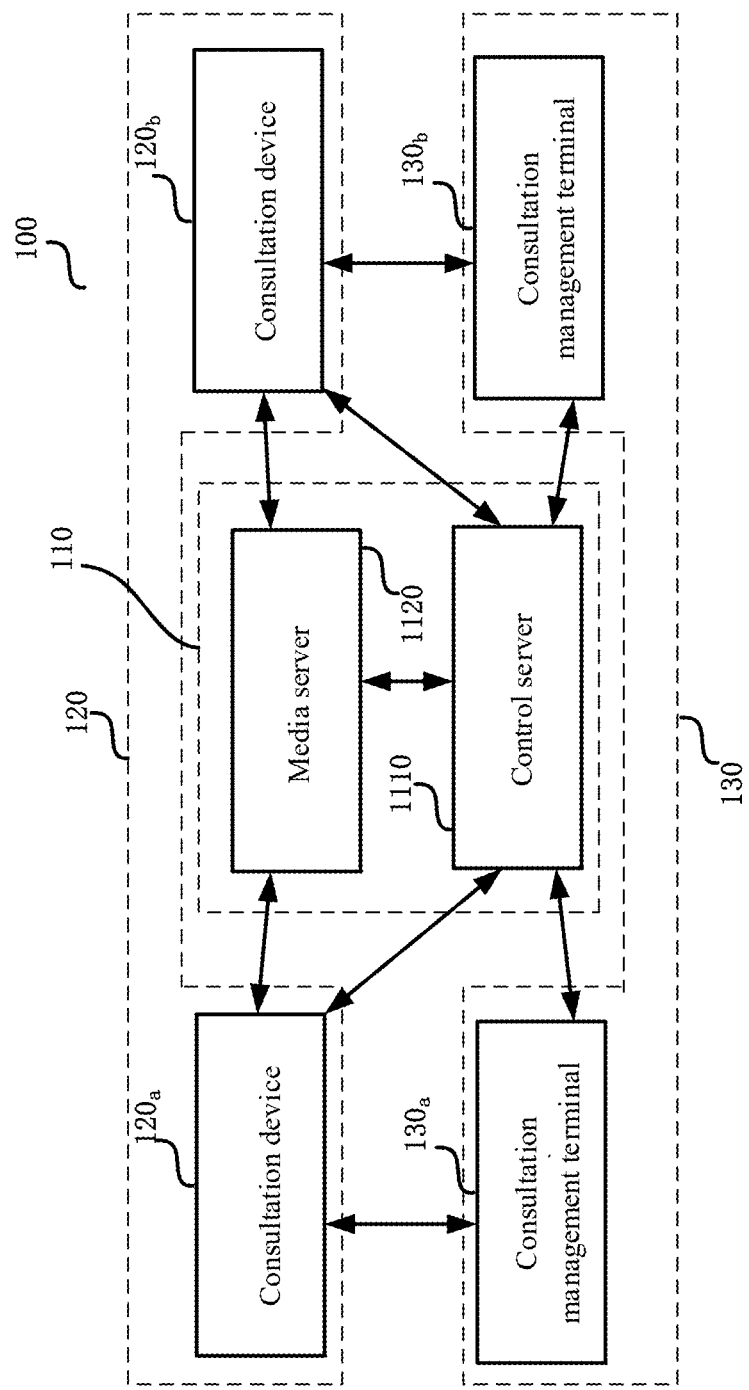
FIG. 1 shows a schematic block diagram illustrating a remote consultation system according to an embodiment of the present disclosure.

In order to make the objectives, technical solutions and advantages of embodiments of the present disclosure more clear, the technical solutions in the embodiments of the present disclosure will be clearly and completely described below in detail in conjunction with the drawings. Obviously, the described embodiments described are merely some but not all of embodiments of the present disclosure. Based on the described embodiments of the present disclosure, all other embodiments obtained by those skilled in the art without creative work also fall within the protecting scope of the present disclosure.

The terms "a(an)", "one", "this", and "the" are intended to mean the presence of one or more elements when referring to the elements and their embodiments of the present disclosure. The terms "comprising", "comprising", "include", "including", "contain", "containing", "have", and "having", etc. are intended to be inclusive and to indicate that there may be additional elements other than the listed elements. The flow charts depicted in the present disclosure is merely an example. There may be many variations of the flowchart or the steps described therein without departing from the spirit of the invention. For example, the steps may be performed in a different order, or steps may be added, deleted, or modified. These variations shall be considered to be a part of what desired to claim.

Unless otherwise defined, all terms (including technical and scientific terms) used herein have the same meaning as commonly understood by those skilled in the art to which the subject matter of the present disclosure belongs. It will be further understood that terms, such as those defined in commonly used dictionaries, should be interpreted as having the meaning that are consistent with their meanings in the context of the specification and the related art and will not be interpreted in an idealized or overly formal sense unless expressly so defined herein. As employed herein, the description of "connecting" or "coupling" two or more parts together should refer to the parts being directly combined together or being combined via one or more intermediate components.

As described above, the remote consultation system may be realized face-to-face based on the Internet in real-time. The hospital system may digitally collect and process the patient diagnosis and treatment information and administrative the management information, for example, with a smart hospital system. However, the remote consultation system does not involve controlling the devices in the system in real-time, and does not perform real-time data transmission with the hospital system, resulting in low efficiency and high cost of consultation.

In order to solve the technical problem above, embodiments of the present disclosure propose the method for the remote consultation. The method may realize the real-time control of the consultation device in the system, and perform the real-time data transmission with the hospital system, thereby improving the efficiency of the consultation and reducing the cost of the consultation.

The remote consultation system according to an embodiment of the present disclosure will be described in detail below in conjunction with FIG. 1.

FIG. 1 shows a schematic block diagram illustrating the remote consultation system according to an embodiment of the present disclosure.

As shown in FIG. 1, the remote consultation system 100 includes a consultation server 110, a consultation device 120 (i.e., 120$_a$, 120$_b$) and a consultation management terminal 130 (i.e., 130$_a$, 130$_b$). In some embodiments of the present disclosure, the remote consultation system 100 may also include three or more consultation devices 120, and/or one or three or more consultation management terminals 130. In an embodiment of the present disclosure, the consultation device 120 may be an interaction display device in the China patent application NO. 201921269816.9. In addition, those skilled in the art may understand that although the remote consultation system 100 in FIG. 1 only shows the consultation server 110 (i.e., a control server 1110 and a media server 1120), the consultation device 120 and the consultation management terminals 130, the example above does not limit the protection scope of the present disclosure. In a practical implement, those skilled may choose to use or not use one or more of the respective devices as discussed above according to actual needs, and various combinations and modifications based on the respective devices as discussed above do not deviate from the protection scope of the present disclosure.

In an embodiment of the present disclosure, the consultation server 110 may include a control server 1110 and a media server 1120. The control server 1110 may be communicatively connected with the media server 1120. The media server 1120 may be a streaming media server for storing and processing audio data and video data. The video data may be high-resolution (e.g., 720P, 1080P, 4k, etc.) video data to provide a high-definition picture for the remote consultation. In an embodiment of the present disclosure, the way for managing and interacting of the consultation server 110 may adopt the method and system for interacting in the patent application NO. 2019109279037.

In an embodiment of the present disclosure, the consultation management terminal 130 may be communicatively connected with the consultation server 110 and control the consultation device 120 via the consultation server 110. In an embodiment of the present disclosure, the consultation device 120 and the consultation management terminal 130 may both be communicatively connected with the consultation server 110, for example, based on MQTT and/or HTTP protocols. The consultation management terminal 130 may be a fixed terminal or a mobile terminal. When the consultation management terminal 130 is the mobile terminal, the consultation management terminal may be a smart phone, a personal digital assistant (PDA), a tablet computer (e.g., iPad of Apple Inc.), a laptop computer, a notebook computer, etc. The consultation management terminal 130 may be uniformly provided by a supplier of the remote consultation system 100, or may be separately purchased and configured, and connected to the remote consultation system 100. Additionally, doctors participating in the consultation may access the remote consultation system 100 using their own smart terminals as the consultation management terminals 130. In an embodiment of the present disclosure, for the purpose of description only, for the consultation management terminal $130_a$, the consultation device $120_a$ may be a local consultation device, and the consultation device $120_b$ may be a remote consultation device. For the consultation management terminal $130_b$, the consultation device $120_b$ may be the local consultation device, and the consultation device $120_a$ may be the remote consultation device.

In an embodiment of the present disclosure, the consultation device 120 may be a device with functions of multimedia data reproduction and data collection. For example, the consultation device 120 may include a reproduction apparatus for reproducing the multimedia data. The multimedia data may include the audio data and the video data. The reproduction apparatus may be an sound-playing device (e.g., a loudspeaker) for reproducing sound and a display device (e.g., a display) for reproducing images, or an integrated device for reproducing sounds and images. The consultation device 120 may also include a collection apparatus for collecting the multimedia data. The collection apparatus may include an imaging apparatus and a sound acquiring apparatus.

The method for remote consultation provided by an embodiment of the present disclosure will be described in detail below in conjunction with FIGS. 2 to 12.

Figure 2:
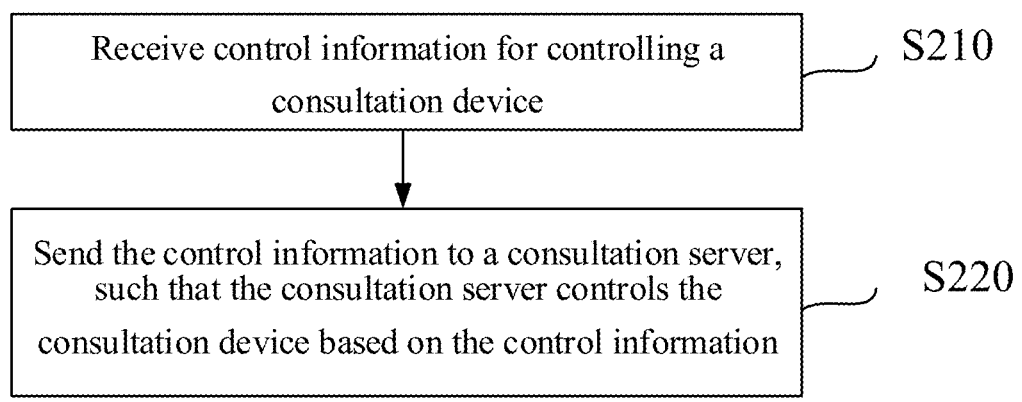
FIG. 2 shows a flowchart illustrating a method for the remote consultation according to an embodiment of the present disclosure.

FIG. 2 shows the flowchart illustrating a method M200 for the remote consultation according to an embodiment of the present disclosure. In an embodiment, the method M200 may be executed by the consultation management terminal 130 in the remote consultation system 100 as shown in FIG. 1.

For illustrative purposes, the method M200 will be described in detail below with the example of the consultation management terminal 130a.

As shown in FIG. 2, at step S210, the control information for controlling the consultation device is received. In an embodiment of the present disclosure, the consultation management terminal 130a may receive control information for controlling the remote consultation device 120 under a communication protocol. In an embodiment of the present disclosure, the received control information for controlling the consultation device 120 may be acquired via a user interface of the consultation management terminal 130a. For example, an operation of a user may be identified via the user interface to acquire the control information. In an embodiment of the present disclosure, the user interface (i.e., UI, which, for example, may be a graphical user interface GUI) of the consultation management terminal 130a may include various icons to provide various operation options.

At step S220, the control information is sent to the consultation server, so that the consultation server controls the consultation device based on the control information. In an embodiment of the present disclosure, the consultation management terminal 130a may send the control information to the consultation server 110 under the communication protocol, so that the consultation server 110 may control the consultation device 120 under the communication protocol based on the control information.

In an embodiment of the present disclosure, in the case where the consultation device 120 includes the imaging apparatus and the sound acquiring apparatus, controlling the consultation device 120 may include at least one of: controlling a reproduction content of the reproduction apparatus; and controlling a reproduction parameter of the reproduction apparatus. In an embodiment of the present disclosure, the reproduction content may include: multimedia data collected at a local consultation device, multimedia data collected at a remote consultation device, information collected by a acquiring card of a medical device, a patient medical record, and an inspection report, etc. In the specification of the present disclosure, the reproduction content may also be referred to as a video source. In an embodiment of the present disclosure, the reproduction parameter may include at least one of: a split screen layout, brightness, contrast, and volume. In the case where the reproduction parameter includes a split screen layout, controlling the reproduction content of the reproduction apparatus may include independently controlling the display content of respective split screens. In an embodiment of the present disclosure, the split screen layout may include the number of the split screens, a size of the split screen, and a relative position of the split screen. The number of split screens is a positive integer. The number of split screens indicates the number of contents that may be displayed simultaneously on the display screen of the display, for example, the number of the split screens being 1 may indicate that the corresponding display screen may only display one video source at one time. The method for the remote consultation performed by the consultation management terminal 130a above will be described in further detail below in conjunction with FIGS. 3 and 4 with respect to the user interface.

Figure 3:
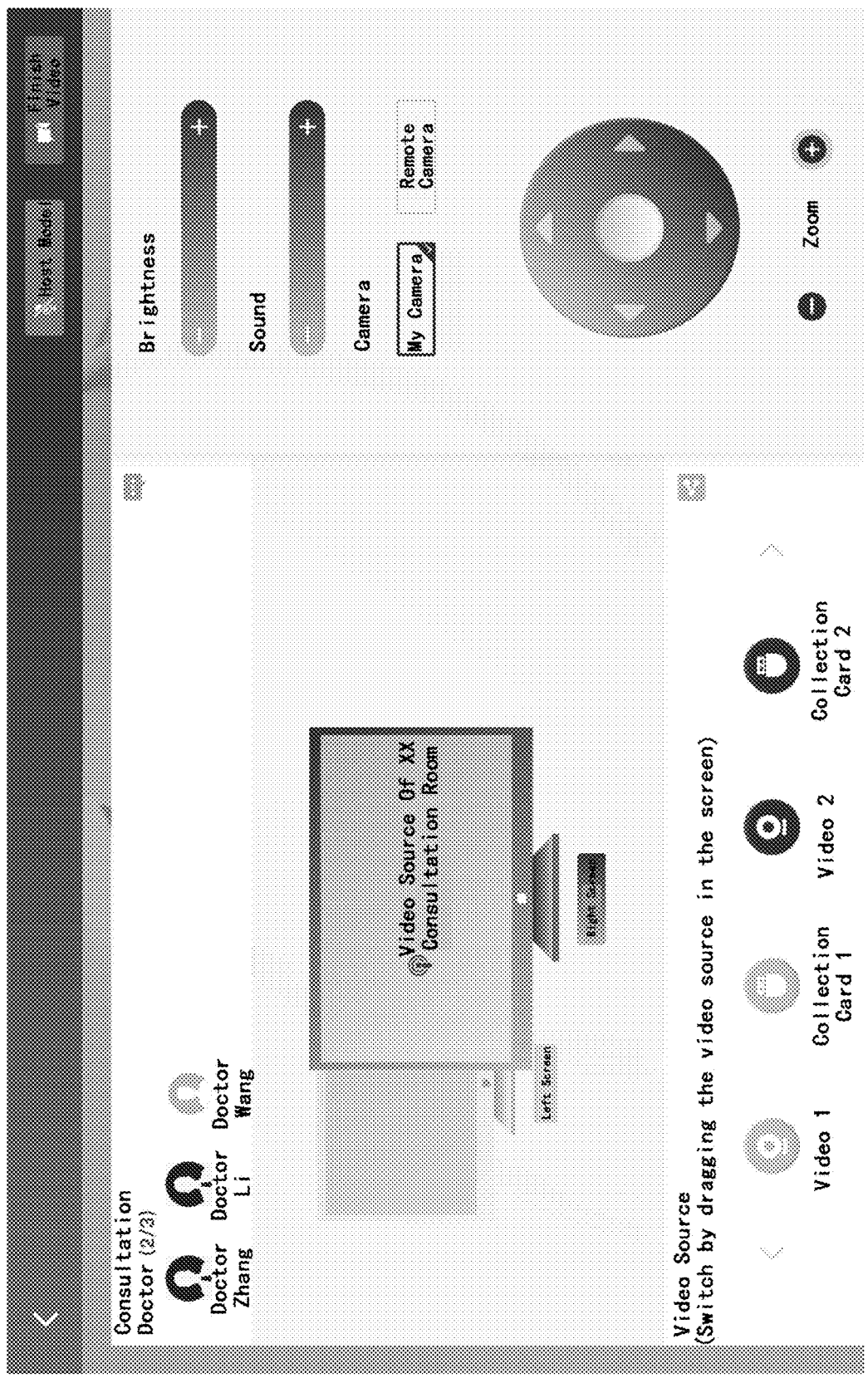
FIG. 3 shows a control interface of a consultation management terminal according to an embodiment of the present disclosure.

FIG. 3 shows a control interface of the consultation management terminal 130 according to some embodiments of the present disclosure. As shown in FIG. 3, the control interface includes an icon of "视频源 (video source)" and an icon of display screen. The icon of the video source correspond to the video source (e.g., "视频 1 (video 1)", "采集卡 1 (collection card 1)", "视 频 2 (video 2)", and "采集卡 2 (collection card 2)") one-to-one. A table of the icons of the display screen corresponds to the display screen of the consultation device. The control interface also includes an icon of "会诊医生 (consultation doctor)". In an embodiment of the present disclosure, the display screen may be designated by selecting the icon of the consultation doctor. For example, the display screen of the consultation device 120 viewed by "王医生 (Doctor Wang)" is designated by selecting an icon of "王医生 (Doctor Wang)". In an embodiment of the present disclosure, the content displayed on the designated display screen may be selected by selecting the icon of the video source. In an embodiment of the present disclosure, by dragging the icon of "视 频 2 (video 2)" to the icon of the display screen, the video 2 may be displayed on the corresponding display screen, and the name of the video source may be displayed on the icon of the display screen in the control interface, e.g., "XX 会诊室视频源 (the video source of XX consultation room)". Specifically, when the dragged video source is the multimedia data collected at the remote consultation device, the consultation management terminal 130 sends a video source request to the control server 1110. The control server 1110 further sends the video source request to the media server 1120. The media server 1120 sends the requested video source data to the designated consultation device 120 after receiving the video request. When the dragged video source is the multimedia data collected at the local consultation device, the consultation device 120 directly reproduces the video source data. When the dragged video source is data in a hospital system, such as medical record information, the consultation management terminal 130 sends the video source request to the control server 1110. The control server 1110 is communicatively connected to a hospital digital system. The control server 1110 sends the request to the digital system and obtains the video source data from the digital system, and sends the video source data to the corresponding consultation device 120. In addition, the dragged video source may also be video data from the medical device (e.g., a medical imaging device), for example, the icons of "采集卡 1 (collection card 1)" and "采集卡 2 (collection card 2)" in FIG. 3.

Figure 4:
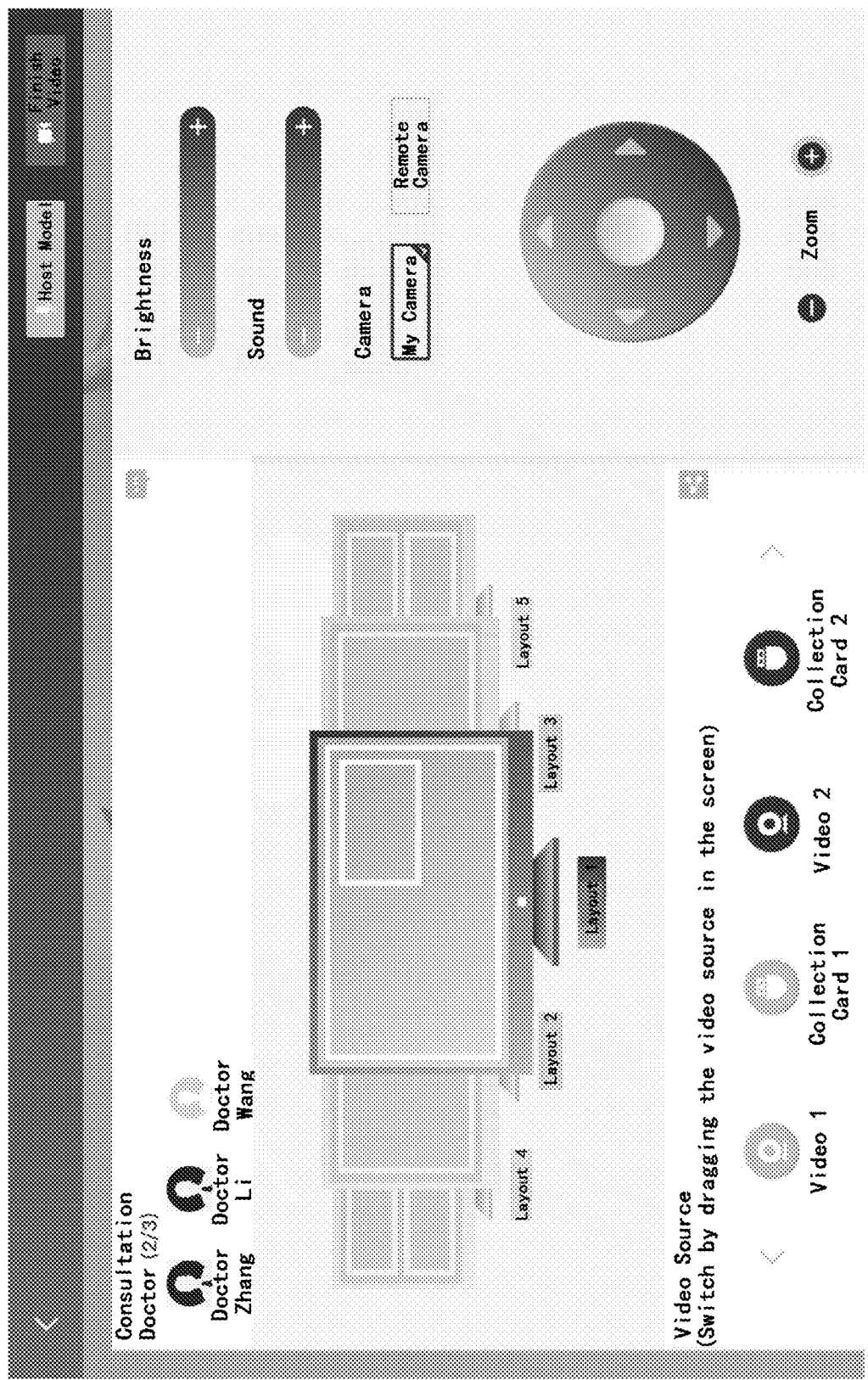
FIG. 4 shows a control interface of the consultation management terminal according to an embodiment of the present disclosure.

FIG. 4 shows a control interface of the consultation management terminal 130 according to other embodiments of the present disclosure. As shown in FIG. 4, in an embodiment of the present disclosure, the icon of the display screen may include an icon of a split screen layout. The split screen layout of the designated display is controlled by selecting different icons of the split screen layout (e.g., full-screen, picture-in-picture, two-split-screen, three-split-screen, and four-split-screen layouts). For example, an icon of picture-in-picture layout is switched (for example, by sliding the icon of the split screen layout) to a selected state, so that the split screen layout of the display screen corresponding to Doctor Wang is the picture-in-picture layout.

Further, in the case where the split screen layout is selected, a display content of respective split screens may also be independently controlled. For example, in the case where the icon of picture-in-picture layout is selected, two different video sources may be dragged to two icons of the split screen layout, respectively, so as to display the selected video source on the split screen of the display screen of the designated consultation device 120.

In an embodiment of the present disclosure, in the case where the consultation device 120 includes the imaging apparatus and the sound acquiring apparatus, controlling the consultation device 120 may include at least one of: adjusting an imaging direction of the imaging apparatus; adjusting an imaging focal length of the imaging apparatus; and enabling or disabling the sound acquiring apparatus. In an embodiment of the present disclosure, the reproduction content may include multimedia data acquired by a camera and a microphone. The method for remote consultation above will be described in detail below with reference to FIGS. 3 and 4 in conjunction with the user interface.

As shown in FIGS. 3 and 4, video 1 may be the multimedia data acquired by a camera and a microphone of the consultation device corresponding to a specific doctor (e.g., "李医生 (Doctor Li)"), and it may be described as the video source of XX (i.e., consultation room number) consultation room. The control interfaces as shown in FIGS. 3 and 4 further include an icon of an imaging direction. The imaging direction of the designated camera may be controlled by operating the icon of the imaging direction. In this embodiment, the camera may be designated by selecting an icon of "摄像头 (a camera)". For example, by clicking the icon of "我的摄像头 (my camera)", my camera may be selected. Then the imaging direction of the camera of my consultation device 120a may be controlled by operating (i.e., clicking or continuous pressing) the icon of the imaging direction. Generally, the camera is installed on a gimbal, and the imaging direction may be changed by controlling the rotation of the gimbal.

As shown in FIGS. 3 and 4, the control interface further includes an icon of "缩放 (zooming)". A focal length of the designated camera may be controlled by operating the icon of zooming. For example, by selecting the icon of "my camera", and the focal length of the camera of my consultation device 120a may be increased or decreased by operating, such as clicking, continuously pressing or dragging the icon of zooming.

Additionally, although not shown in FIGS. 3 and 4, the control interface may further include icons for microphone enabling and disabling. The designated microphone may be enabled or disabled by operating (e.g., clicking) the icons for microphone enabling or disabling. Similar to the method for designating the camera, the microphone may be designated by selecting the icon of the microphone.

In addition, the control interface of the consultation management terminal further includes the icon of a text information interaction. The text information may be displayed on the designated display screen by operating the icon of the text information interaction. The operation will be described in detail below with reference to FIG. 5.

Figure 5:
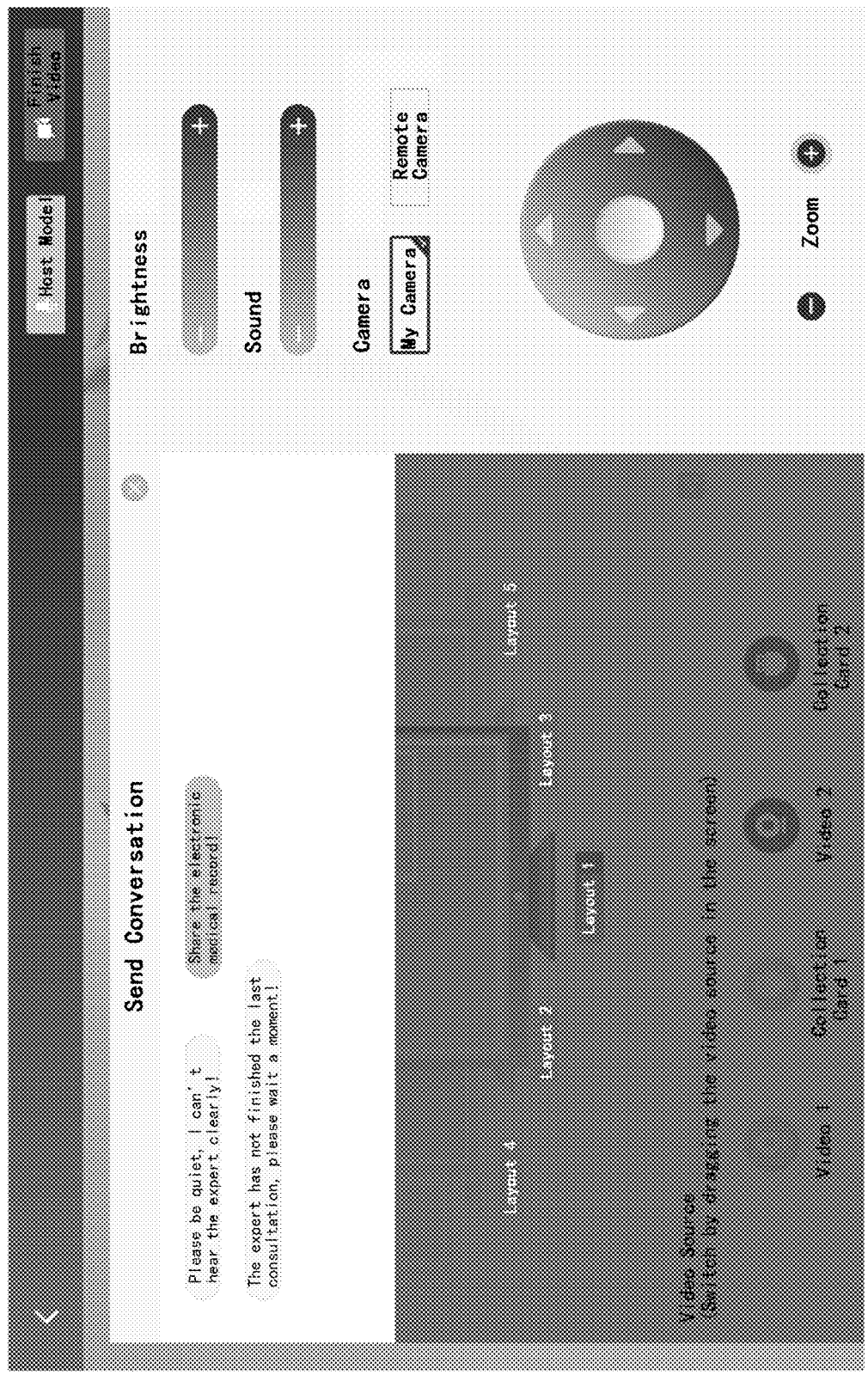
FIG. 5 shows a control interface of the consultation management terminal according to an embodiment of the present disclosure.

FIG. 5 shows a control interface of the consultation management terminal 130 according to some embodiments of the present disclosure. As shown in FIG. 5, after a user operates (e.g., clicks) the selected icon of the text information interaction, the control interface displays a pop-up window. Then, the text information may be displayed on a corresponding display screen by selecting the option of preset text information displayed in the pop-up window. In an embodiment of the present disclosure, the preset text messages include "请安静，听不清专家讲话了 (Please be quiet, I can't hear the expert clearly)", "把电子病历分享一下 (Share the electronic medical record)" and "专家还未结束上一个会诊，请大家稍等 (The expert has not finished the last consultation, please wait a moment)". When the preset text information of "Share the electronic medical record" is selected by clicking, the preset text information may be displayed on a corresponding display screen. In an embodiment of the present disclosure, the corresponding display screen may be the display screen corresponding to the selected consultation doctor or the display screens of the all consultation devices in the remote consultation system. In addition, the preset text information may be displayed on an additional display screen of the corresponding display screen. The additional display screen does not correspond to the icon of the display screen. A size of the additional display screen may be determined by the displayed text information, or it may be fixed. A position of the additional display screen may be moved, for example, from a left side of the display screen to a right side of the display screen. The position of the additional display screen may also be fixed, for example, in a middle of the display screen. The content displayed on the additional display screen may lay over the content displayed on the split screen.

Additionally, the control interface of the consultation management terminal also includes an icon for video sharing. The content of the same video source may be displayed on the display screens of all consultation devices by operating the icon for video sharing. The operation will be described in detail below with reference to FIG. 6.

Figure 6:
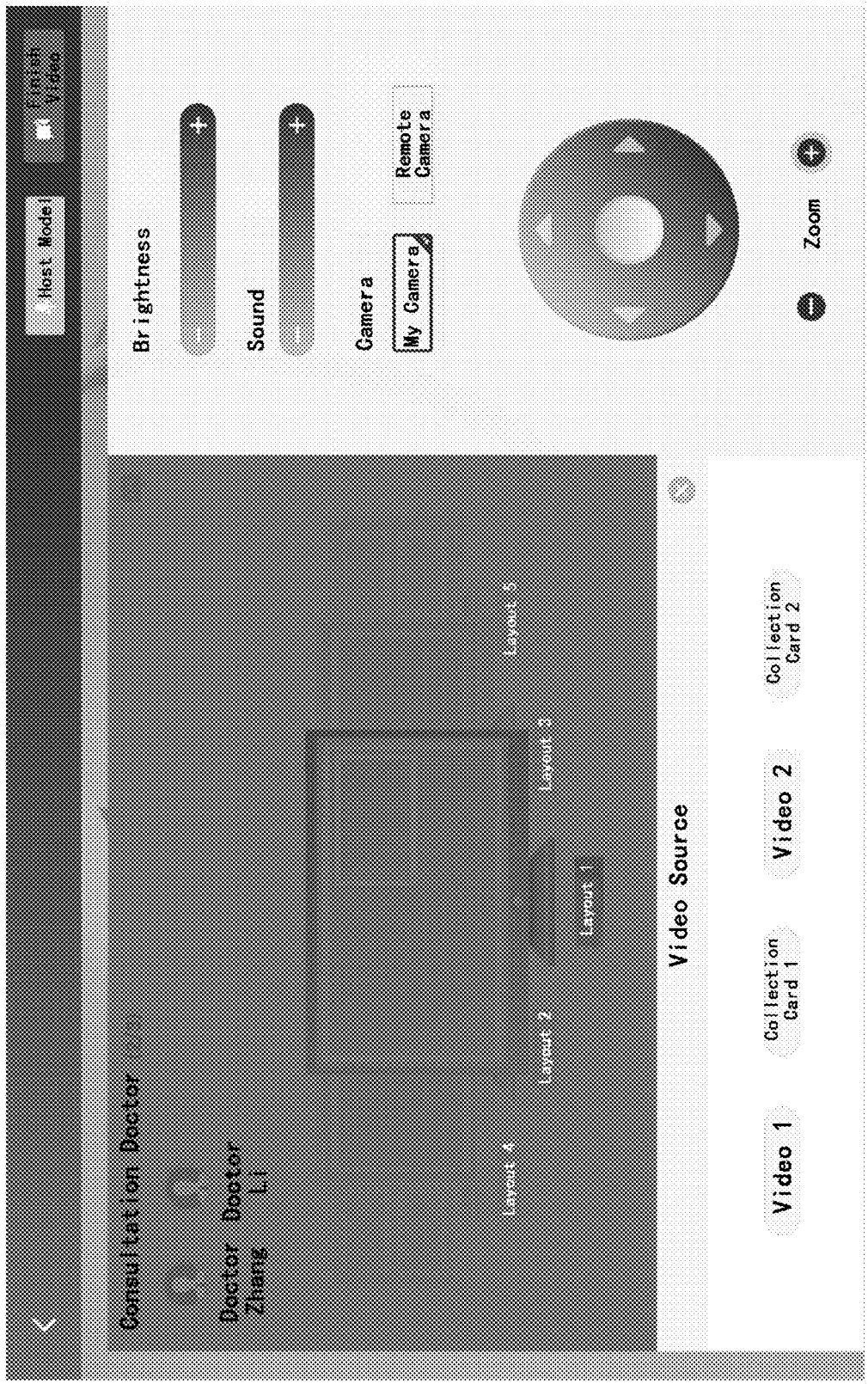
FIG. 6 shows a control interface of the consultation management terminal according to an embodiment of the present disclosure.

FIG. 6 shows a control interface of the consultation management terminal 130 according to some embodiments of the present disclosure. As shown in FIG. 6, after the user selects (e.g., by clicking) the icon of video sharing, the control interface displays the pop-up window. Then, an option of "视频源 (video source)" displayed in the pop-up window may be selected (e.g., by clicking) to display the video source on the display screens of all consultation devices. In an embodiment of the present disclosure, the option of the video source corresponds to the icon of the video source on the control interface one-to-one. For example, when the option of "视频 1 (video 1)" is selected by clicking, video 1 will be displayed on all of the display screens.

Additionally, in an embodiment of the present disclosure, the method for the remote consultation may further includes receiving consultation information from the consultation server. Specifically, the consultation management terminal 130 receives the consultation information from the consultation server 110 under the communication protocol. In an embodiment of the present disclosure, the consultation information may include but not limited to status data of the consultation device, consultation data, doctor data, and patient data. In an embodiment of the present disclosure, the consultation server 110 (e.g., the control server 1110) may be communicatively connected to the hospital digital system to obtain the consultation data, the doctor data, and the patient data from the hospital system, thereby improving the efficiency of the remote consultation and reducing the cost of the remote consultation.

In an embodiment of the present disclosure, the method for the remote consultation may further include displaying the consultation information. The status data of the consultation device is shown in the control interfaces as shown in FIGS. 3 and 4. As described above, video 1 may be the multimedia data acquired by the camera and the microphone of the consultation device 120 corresponding to Doctor Li. In an embodiment of the present disclosure, when the camera and the microphone of the consultation device 120 corresponding to Doctor Li do not function normally, the icon of "视频 1 (video 1)" is displayed in gray. When the icon of the video source is gray, the corresponding video source cannot be dragged and displayed. In addition, a consultation task list interface further shows the consultation data. The consultation data includes but not limited to an appointment Id of a consultation task, an illness, a time period, a consultation type, start time of consultation, information of consultation admission and demand-side, a consultation date, a status of a consultation task, patient Id, a location of consultation admission, a location of demand-side consultation, a patient name, a contact telephone number, etc.

Figure 7:
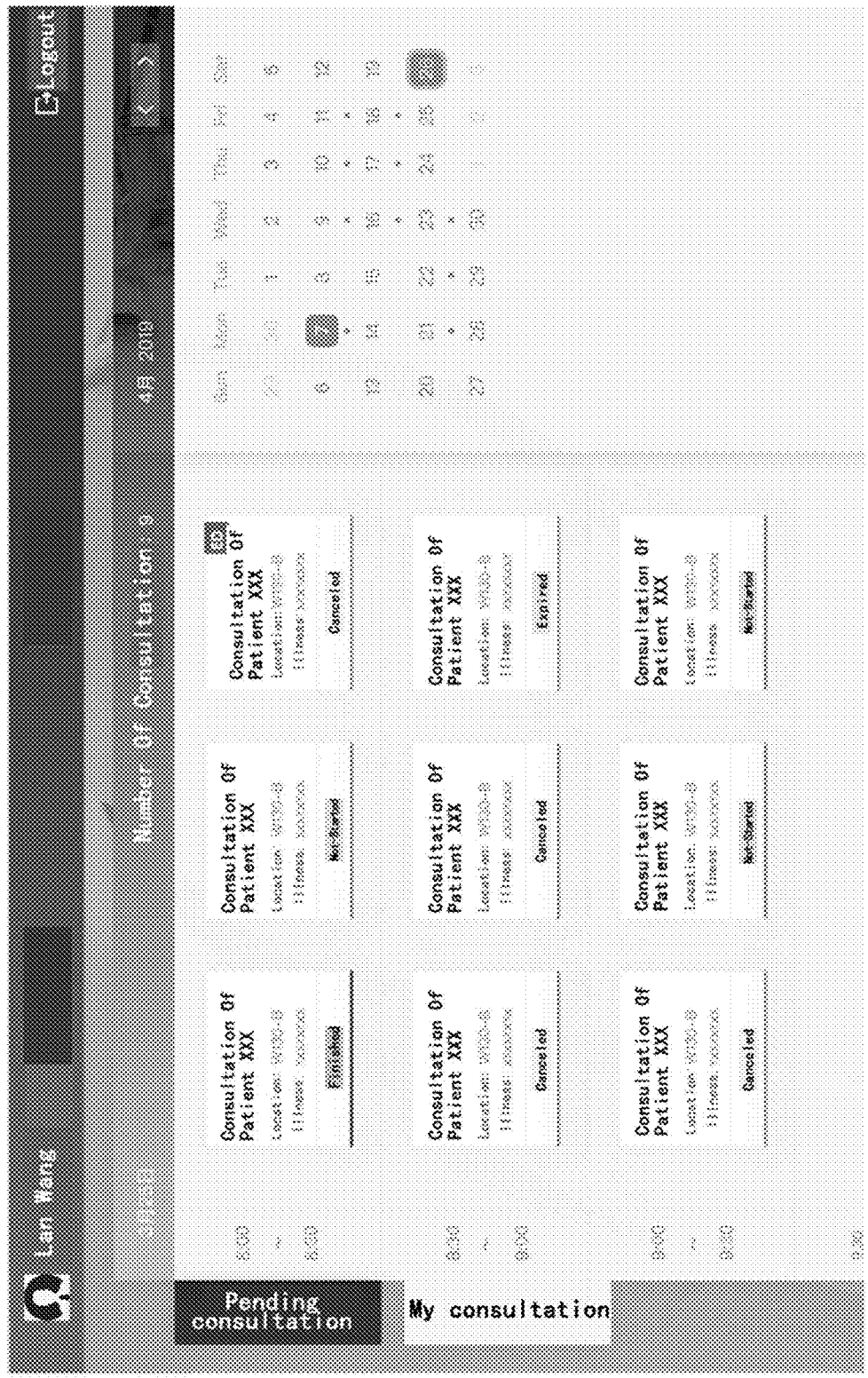
FIG. 7 shows a task list interface of the consultation management terminal according to an embodiment of the present disclosure.

FIG. 7 shows the consultation task list interface of the consultation management terminal 130 according to an embodiment of the present disclosure. The consultation task list interface as shown in FIG. 7 illustrates the consultation name, the location of consultation, a patient illness, the status of consultation task and a category of consultation. In an embodiment of the present disclosure, the patient may make an appointment with the remote consultation in a hospital, and the hospital digital system (not shown) may generate the consultation task of the remote consultation according to the appointment. Then, data of the consultation task and the related consultation data may be provided to the consultation management terminal 130 via the consultation server 110 (e.g., a control server 1110). The consultation task status may include a "已完成 (completed)" status, a "未开始 (not-started)" status, a pending status, an in-progress status, a "已取消 (canceled)" status and an expired status. The consultation category may include a normal consultation and an emergency consultation. When the consultation is an emergency consultation, an emergency consultation marker is displayed on the corresponding icon of the consultation task in the consultation task list interface. The doctors may be enabled to view the consultation information at any time and reasonably arrange consultation time by displaying the consultation data on the consultation task list interface, thereby improving the efficiency and operability of the remote consultation.

In addition, the doctor may switch between a tab of pending consultation and a table of my consultation in the consultation task list. By selecting a date on the two tabs, pending consultation tasks or all consultation tasks on the date may be viewed.

In an embodiment of the present disclosure, the doctor may switch to an interface of consultation details by clicking an icon of the consultation task on the consultation task list interface, so as to view data of doctor and patient corresponding to the consultation in the interface of consultation details.

Figure 8:
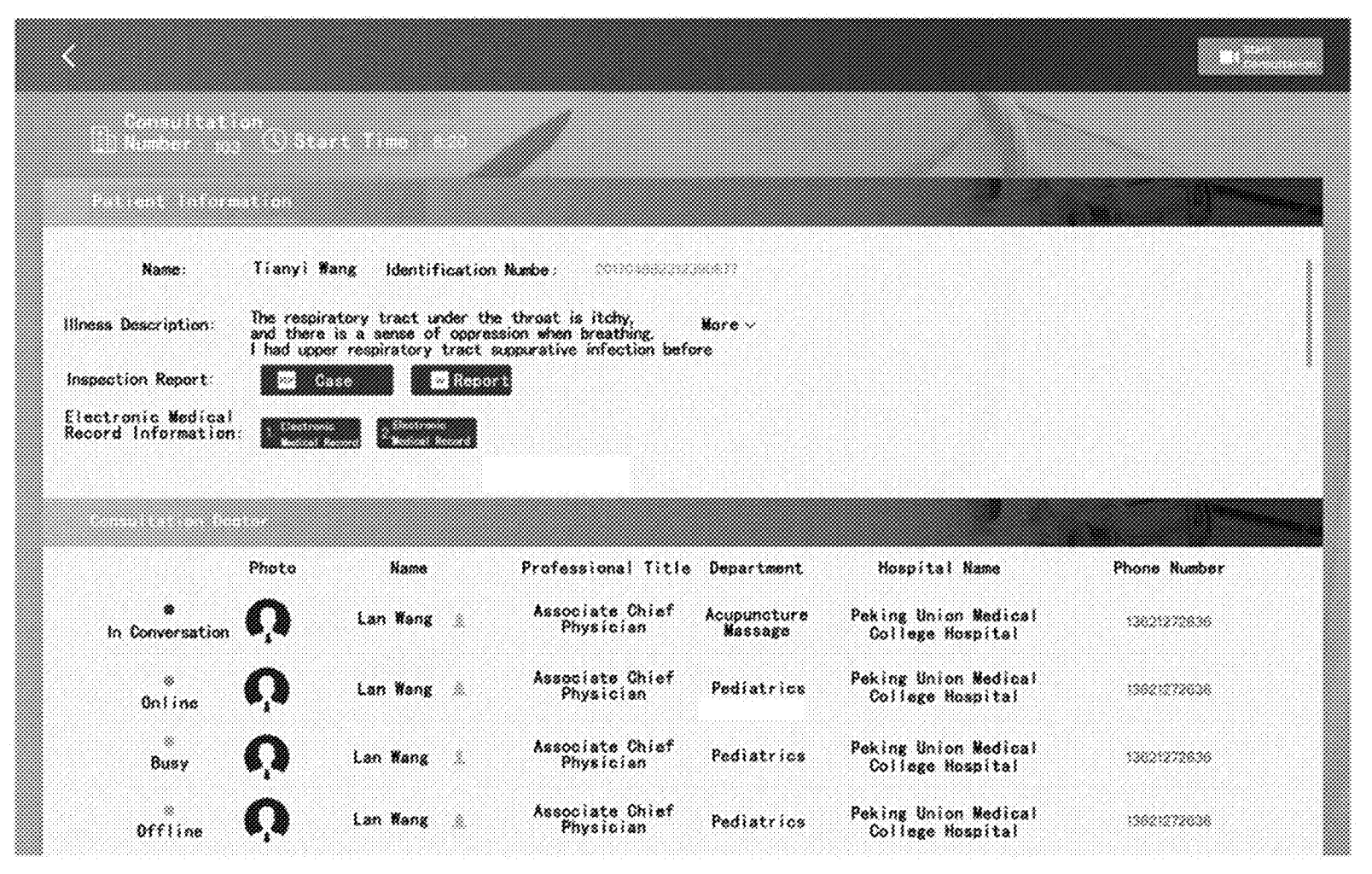

FIG. 8 shows the interface of the consultation details of the consultation management terminal according to some embodiments of the present disclosure. FIG. 8 shows the interface of the consultation details when the consultation is not started. The data of a consultation doctor and a patient are shown on the interface of the consultation details. In an embodiment of the present disclosure, the data of the doctor may include a doctor Id, a doctor name, an professional title, a hospital Id, a hospital name, a gender, a facial image, a telephone number, etc. The patient data includes a patient Id, a patient number, a patient name, a gender, an ID type, an ID number, a date of birth, an age, a telephone number, and medical record information, etc. The medical record information includes all the medical records and examination reports of the patient. For example, the medical record information includes a medical record Id, a medical record number, a medical record name, a medical condition description, an examination type, an import method, a file Id, a file name, and a file path, etc. In an embodiment, the doctor may click on an icon of the medical record to view or save detailed information of the medical record. In addition, the doctor can switch to the interface of the consultation details by clicking on an icon of returning.

Figure 9:
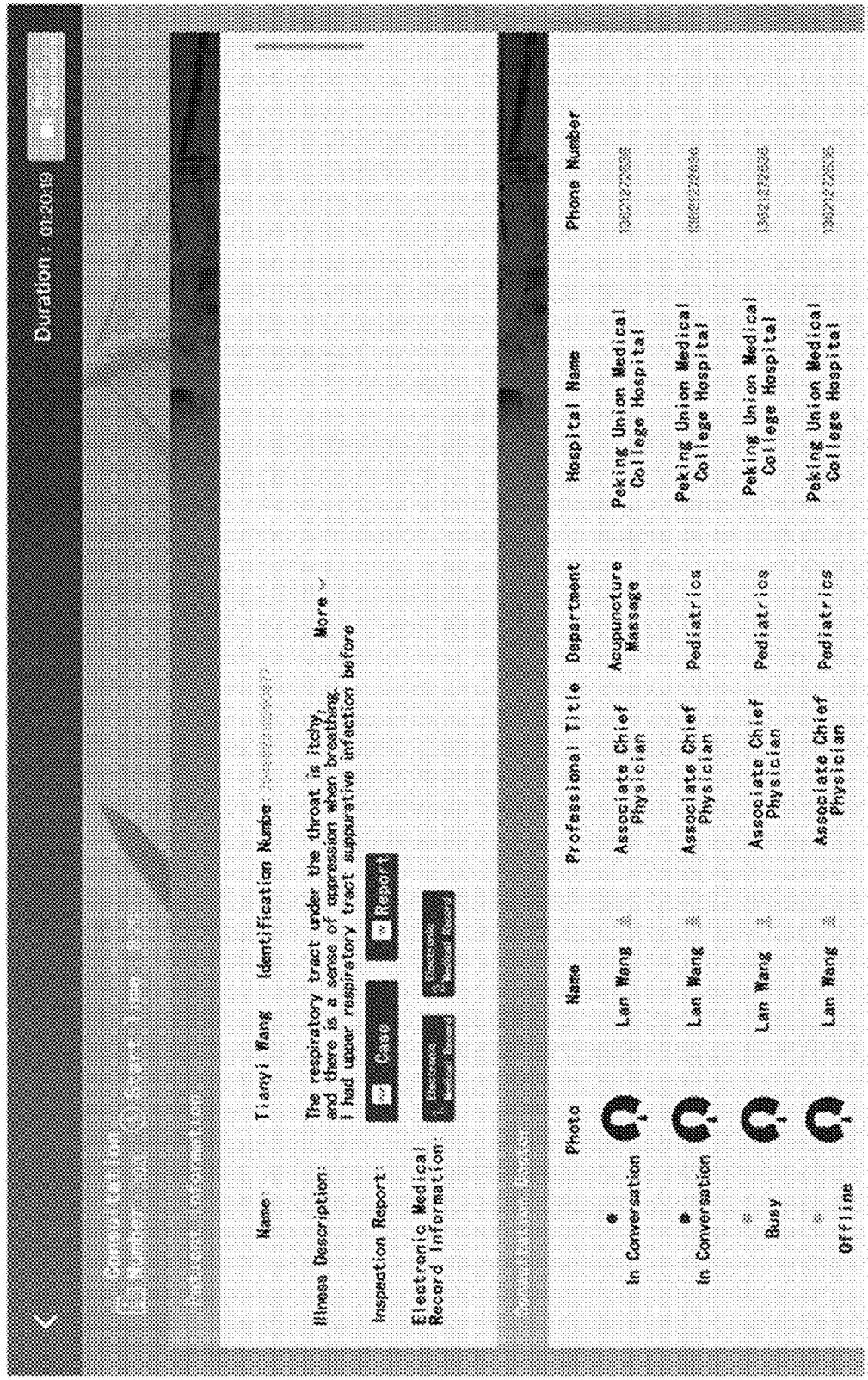
FIG. 9 shows an interface of consultation details of the consultation management terminal according to an embodiment of the present disclosure.

Similarly, FIG. 9 shows the interface of the consultation details of the consultation management terminal according to other embodiments of the present disclosure. FIG. 9 shows the interface of the consultation details when the consultation is in progress. Similar to FIG. 8, the data of the consultation doctor and the patient are shown on the interface of the consultation details, which will be omitted. In addition, the doctor may switch to the control interface of the consultation in progress by sliding left or right.

In an embodiment of the present disclosure, the method for the remote consultation may further include sending the consultation request to the consultation server 110. In an embodiment of the present disclosure, the consultation server 110 may establish the consultation task based on the acquired registration information of the remote consultation. The registration information of the remote consultation may be acquired by the consultation server 110 from a hospital smart system. The consultation management terminal 130a may send the consultation request to the consultation server 110. The consultation server 110 may establish a consultation space based on the consultation request and send information of establishing the consultation space to the consultation device 120. The consultation device 120 may log in the consultation space in response to the information of establishing the consultation space. The consultation server 110 may further send information of successfully establishing the consultation in response to the consultation device logging in the consultation space. In addition, the method for the remote consultation may further include receiving the information of successfully establishing the consultation from the consultation server, and notifying the user of start of the consultation in response to the information of successfully establishing the consultation. This will be described in detail below in conjunction with FIGS. 8 and 9.

The doctor may click on an icon of "发起会诊 (starting consultation)" on the interface of the consultation details as shown in FIG. 8, and the control server 1110 establishes the consultation task based on the acquired registration information of the remote consultation. The consultation management terminal 130a sends the consultation request to the consultation server 110. In the case of receiving the consultation request, the consultation server 110 establishes the consultation space. Specifically, the media server 1120 is controlled to establish the consultation space in response to the consultation request. Otherwise, it continues to wait for the consultation request. In the case where the consultation space is established, the consultation server 110 sends the information of establishing the consultation space to the consultation device 120. Specifically, the media server 1120 sends the information of establishing the consultation space to the control server 1110 under, e.g., the HTTP protocol, and then the control server 1110 sends the information of establishing the consultation space to the consultation device 120 under, e.g., the MQTT protocol. Otherwise, it continues to wait for the information of establishing the consultation space. After receiving the information of establishing the consultation space, the corresponding consultation device 120 may log in the consultation space. In the case where the consultation device 120 successfully logs in the consultation space, the control server 1110 (e.g., under the MQTT) sends information of the remote consultation starting to the consultation management terminal 130. Then, the consultation management terminal 130 notifies the user of the consultation starting. For example, by updating status information of the consultation, an icon of starting consultation on the interface of the consultation details may be changed into an icon of "返回会诊 (returning to consultation)" and duration of the current consultation may be displayed, as shown in FIG. 9. The user may switch the user interface to the control interface as shown in FIG. 3 or FIG. 4 by clicking the icon of returning to consultation. In addition, in an embodiment of the present disclosure, the status information of the consultation management terminal 130a may be sent to the consultation server 110 (e.g., under the MQTT protocol). In an embodiment of the present disclosure, the status of the consultation management terminal 130a may include an online status, an offline status, a busy status, and the like.

In an embodiment of the present disclosure, the method for the remote consultation may further include user registering, user logging in, user right managing and user information editing. In a login interface, the doctor may enter a user name (e.g., a doctor number), a password, and another information in a text input box by selecting (e.g., clicking) a corresponding icon of user registering, user logging in, user right managing and user information editing.

In an embodiment of the present disclosure, the method for the remote consultation may further include sending initialization configuration information to the local consultation device to initialize the local consultation device. In an embodiment of the present disclosure, the consultation management terminal 130a may set shutdown time, a server address, etc. of the consultation device 120a via a consultation device configuration interface (not shown).

Figure 10:
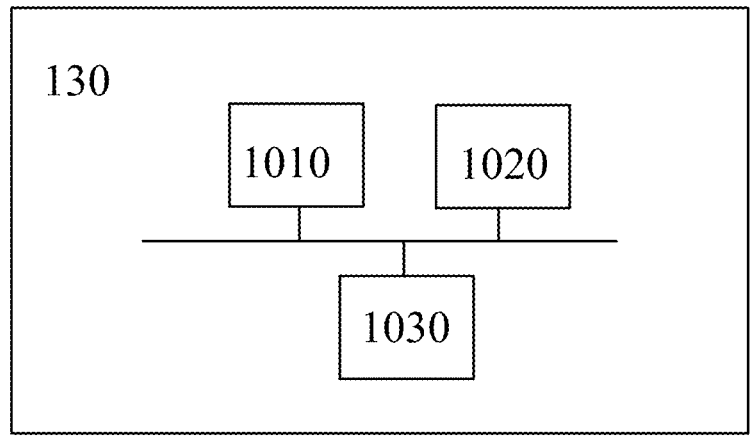
FIG. 10 shows a schematic diagram illustrating the consultation management terminal according to an embodiment of the present disclosure.

FIG. 10 is a schematic diagram illustrating the consultation management terminal 130 according to some embodiments of the present disclosure. As shown in FIG. 10, the consultation management terminal 130 may include one or more processors 1010 and a memory 1020 coupled to the processor 1010. In an embodiment of the present disclosure, the memory 1020 may be a computer-readable storage medium. The consultation management terminal 130 may further include an I/O device 1030 coupled to the processor 1010 and the memory 1020. The memory 1020 may have computer program instructions stored therein. The computer program instructions, when executed by the processor 1010, cause the consultation management terminal 130 to implement the method described in conjunction with FIGS. 2 to 9.

Figure 11:
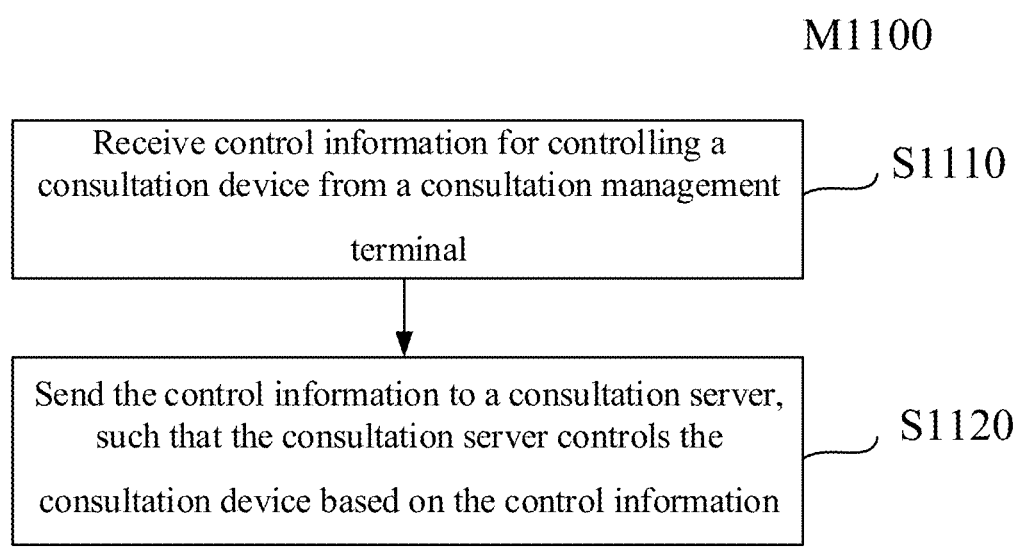
FIG. 11 shows a flowchart illustrating a method for the remote consultation according to an embodiment of the present disclosure.

FIG. 11 shows a flowchart illustrating the method M1100 for the remote consultation according to an embodiment of the present disclosure. In an embodiment of the present disclosure, the method may be executed by the consultation server 110 in the remote consultation system 100 as shown in FIG. 1.

At step S1110, the control information for controlling the consultation device is received from the consultation management terminal. In an embodiment of the present disclosure, the consultation server 110 may receive the control information for controlling the consultation device 120 from the consultation management terminal 130a. At step S1120, the consultation device is controlled based on the control information. In an embodiment of the present disclosure, the consultation server 110 may control the consultation device 120 based on the control information. The consultation management terminal 130a may execute step S210 and step S220.

In addition, the consultation method M1100 may further include: establishing the consultation task; receiving the consultation request corresponding to the consultation task from the consultation management terminal 130; establishing the consultation space based on the consultation request; sending information of establishing the consultation space to the consultation device 120, such that the consultation device 120 logs in the consultation space; and sending the information of successfully establishing the consultation to the consultation management terminal 130a to start the consultation, in response to the consultation device logging in the consultation space. In an embodiment of the present disclosure, the consultation task may be established via the control server 1110. The consultation request may be received from the consultation management terminal 130 via the control server. In response to the consultation request, the media server 1120 is controlled by the control server 1110 to establish the consultation space. Then, in response to establishing the consultation space, the information of establishing the consultation is sent to the consultation device 120 via the control server 1110. In response to the consultation device 120 logging in the consultation space, the information of successfully establishing the consultation is sent to the consultation management terminal 130a via the control server 1110. The above method M1100 has been described in detail above in conjunction with FIG. 2 to FIG. 9 and will be omitted here.

Figure 12:
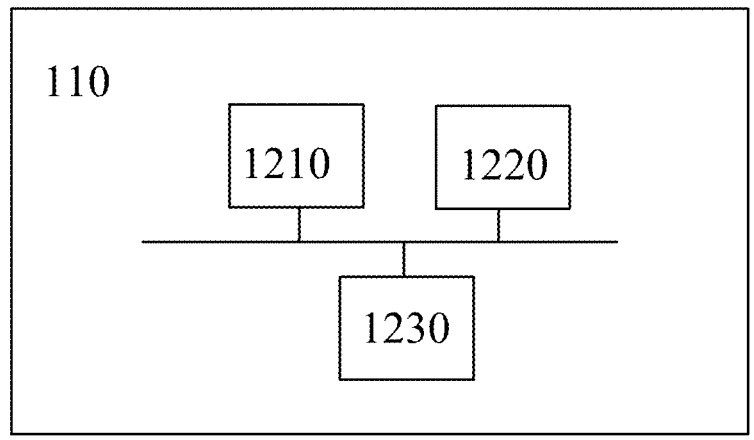
FIG. 12 shows a schematic diagram illustrating a consultation server according to an embodiment of the present disclosure.

FIG. 12 shows a schematic diagram illustrating the consultation server 110 according to some embodiments of the present disclosure. As shown in FIG. 12, the consultation server 110 may include one or more processors 1210 and a memory 1220 coupled to the processor 1210. The consultation server 110 may further include an I/O device 1230 coupled to the processor 1210 and the memory 1220. The computer program instructions stored in the memory 1220, when executed by the processor 1210, cause the server 110 to implement the method described in conjunction with FIGS. 2 to 11.

In addition, the present disclosure further provides an interaction method. The interaction method will be described below in conjunction with FIG. 13.

Figure 13:
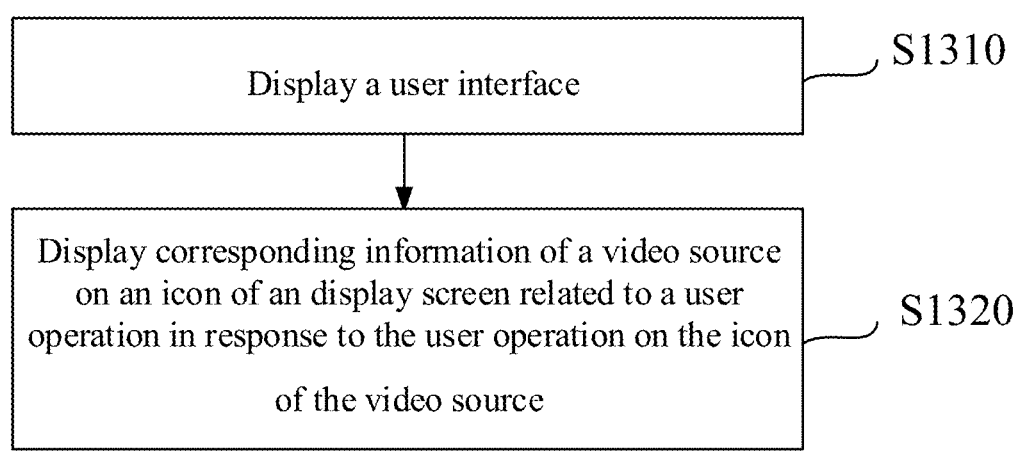
FIG. 13 shows a flowchart illustrating an interaction method according to the present disclosure.

FIG. 13 shows a flowchart illustrating the interaction method M1300 according to an embodiment of the present disclosure. At step S1310, the user interface is displayed, wherein the user interface includes the icon of the video source corresponding to the video source and the icon of display screen corresponding to the display screen of the consultation device. At step S1320, the corresponding description of the video source is displayed on the icon of the display screen related to a user operation in response to the user operation on the icon of the video source. In an embodiment of the present disclosure, the user operation may include dragging the icon of the video source to the screen area corresponding to the icon of the split screen layout.

In addition, in the case where the user interface (e.g., control interface) includes the icon of the text information interaction, and the consultation device includes a display screen corresponding to the icon of the display screen and an additional display screen not corresponding to the icon of the display screen, the interaction method M1300 may further include: displaying the pop-up window in response to an operation of selecting the icon of the text information interaction by the user, the pop-up window has the preset text information; and sending the selected preset text information to the additional display screen of the consultation device 120 in response to selecting the preset text information in the pop-up window by the user.

In addition, in the case where the user interface (e.g., control interface) includes the icon of video sharing, the interaction method M1300 may further include: displaying the pop-up window in response to selecting the icon of video sharing by the user, the pop-up window has the option corresponding to the video source; and displaying the selected video source on all of the consultation devices in response to selecting the option in the pop-up window by the user.

The interaction method M1300 described above has been described in detail above in conjunction with FIGS. 2 to 11, and will be omitted here.

Several embodiments of the present disclosure have been described specifically above, but the protection scope of the present disclosure is not limited thereto. In fact, the novel embodiments described herein can be implemented in various other forms. in addition, various omissions, substitutions and modifications in the form of the embodiments described herein may be made without departing from the spirit of the present disclosure. The appended claims and their equivalents are intended to cover such forms or modifications that fall within the scope and spirit of the present disclosure.

The invention claimed is:

1. A method for a remote consultation, comprising:
receiving control information for controlling a consultation device; and
sending the control information to a consultation server, such that the consultation server controls the consultation device based on the control information, wherein the consultation device comprises a reproduction apparatus for reproducing multimedia data, and controlling the consultation device comprises at least one of:
controlling a reproduction content of the reproduction apparatus; and
controlling a reproduction parameter of the reproduction apparatus; wherein the consultation device comprises a local consultation device and a remote consultation device, the consultation server comprises a control server and a media server, and the reproduction content comprises a first video source from the remote consultation, a second video source from the local consultation device and a third video source from a hospital digital system, wherein controlling the reproduction parameter of the reproduction apparatus comprising at least one of:
1) sending, via the local consultation device, a request for the first video source to the control server;
sending, via the control server, the request for the first video source to the media server;
sending, via the media server, the first video source to the reproduction apparatus of the local consultation device; and
reproducing the first video source via the reproduction apparatus of the local consultation device;
2) directly reproducing the second video source via the reproduction apparatus of the local consultation device; or
3) sending, via the local consultation device, a request for the third video source to the control server;
sending, via the control server, the request for the third video source to the hospital digital system;
sending, via the hospital digital system, the third video source to the control server; and
sending, via the control server, the third video source to the reproduction apparatus of the local consultation device; and
reproducing the third video source via the reproduction apparatus of the local consultation device.

2. The method according to claim 1, wherein the consultation device further comprises an imaging apparatus and a sound acquiring apparatus, and controlling the consultation device comprises at least one of:
adjusting an imaging direction of the imaging apparatus;
adjusting an imaging focal length of the imaging apparatus; and
enabling or disabling the sound acquiring apparatus.

3. The method according to claim 1, wherein receiving control information for controlling the consultation device comprises acquiring the control information via a user interface.

4. The method according to claim 1, further comprising:
receiving consultation information from the consultation server; and
displaying the consultation information.

5. The method according to claim 4, wherein the consultation information comprises at least one of: status data of the consultation device, consultation data, doctor data and patient data.

6. The method according to claim 1, further comprising:
sending a consultation request to the consultation server, wherein the consultation server is configured to establish a consultation space based on the consultation request and send information of establishing the consultation space to the consultation device, the consultation device is configured to log in the consultation space in response to the information of establishing the consultation space, and the consultation server is further configured to send information of successfully establishing the consultation in response to the consultation device logging in the consultation space;
receiving the information of successfully establishing the consultation from the consultation server; and
notifying a user of starting the consultation in response to the received information of successfully establishing the consultation.

7. The method according to claim 1, further comprising at least one of the following consultation operations: user registration, user login, user right management, and user information editing.

8. The method according to claim 1, the consultation device comprising a local consultation device and a remote consultation device, wherein the method further comprises:
sending initialization configuration information to the local consultation device to initialize the local consultation device.

9. A consultation management terminal, comprising:
a processor; and
a memory with computer programs stored therein;
wherein the computer programs, when executed by the processor, causes the consultation management terminal to implement a method for a remote consultation, comprising:
receiving control information for controlling a consultation device; and
sending the control information to a consultation server, such that the consultation server controls the consultation device based on the control information,
wherein the consultation device comprises a reproduction apparatus for reproducing multimedia data, and controlling the consultation device comprises at least one of:
controlling a reproduction content of the reproduction apparatus; and
controlling a reproduction parameter of the reproduction apparatus;
wherein the consultation device comprises a local consultation device and a remote consultation device, the consultation server comprises a control server and a media server, and the reproduction content comprises a first video source from the remote consultation, a second video source from the local consultation device and a third video source from a hospital digital system,
wherein controlling the reproduction parameter of the reproduction apparatus comprising at least one of:
1) sending, via the local consultation device, a request for the first video source to the control server;
sending, via the control server, the request for the first video source to the media server;
sending, via the media server, the first video source to the reproduction apparatus of the local consultation device; and
reproducing the first video source via the reproduction apparatus of the local consultation device;
2) directly reproducing the second video source via the reproduction apparatus of the local consultation device; or
3) sending, via the local consultation device, a request for the third video source to the control server;
sending, via the control server, the request for the third video source to the hospital digital system;
sending, via the hospital digital system, the third video source to the control server; and
sending, via the control server, the third video source to the reproduction apparatus of the local consultation device; and
reproducing the third video source via the reproduction apparatus of the local consultation device.

10. A method for remote consultation, comprising:
receiving control information for controlling a consultation device from a consultation management terminal; and
controlling the consultation device based on the control information,
wherein the consultation device comprises a reproduction apparatus for reproducing multimedia data, and controlling the consultation device comprises at least one of:
controlling a reproduction content of the reproduction apparatus; and
controlling a reproduction parameter of the reproduction apparatus,
wherein the consultation device comprises a local consultation device and a remote consultation device, and the reproduction content comprises a first video source from the remote consultation, a second video source from the local consultation device and a third video source from a hospital digital system,
wherein controlling the reproduction parameter of the reproduction apparatus comprising at least one of:
1) sending, via the local consultation device, a request for the first video source to a control server;
sending, via the control server, the request for the first video source to a media server;
sending, via the media server, the first video source to the reproduction apparatus of the local consultation device; and
reproducing the first video source via the reproduction apparatus of the local consultation device;
2) directly reproducing the second video source via the reproduction apparatus of the local consultation device; or
3) sending, via the local consultation device, a request for the third video source to the control server;
sending, via the control server, the request for the third video source to the hospital digital system;
sending, via the hospital digital system, the third video source to the control server; and
sending, via the control server, the third video source to the reproduction apparatus of the local consultation device; and
reproducing the third video source via the reproduction apparatus of the local consultation device.

11. The method according to claim 10, further comprising:
establishing a consultation task;
receiving, from the consultation management terminal, a consultation request corresponding to the consultation task;
establishing a consultation space based on the consultation request;

sending information of establishing the consultation space to the consultation device, such that the consultation device logs in the consultation space; and sending, in response to the consultation device logging in the consultation space, information of successfully establishing the consultation to the consultation management terminal to start the consultation.

12. The method according to claim 11, wherein, establishing the consultation task comprises:

establishing the consultation task via a control server;

receiving the consultation request corresponding to the consultation task from the consultation management terminal comprises:

receiving the consultation request from the consultation management terminal via the control server;

sending the information of establishing the consultation space to the consultation device comprises:

controlling, in response to the consultation request, the media server to establish the consultation space via the control server; and sending, in response to establishing the consultation space, information of establishing the consultation space to the consultation device via the control server; and sending, in response to the consultation device logging in the consultation space, information of successfully establishing the consultation to the consultation management terminal to start the consultation comprises:

sending, in response to the consultation device logging in the consultation space, the information of successfully establishing the consultation to the consultation management terminal using the control server.

13. A consultation server, comprising:

a processor; and a memory with computer programs stored therein, wherein the computer programs, when executed by the processor, causes the consultation server to implement a method for remote consultation, comprising:

receiving control information for controlling a consultation device from a consultation management terminal; and controlling the consultation device based on the control information, wherein the consultation device comprises a reproduction apparatus for reproducing multimedia data, and controlling the consultation device comprises at least one of:

controlling a reproduction content of the reproduction apparatus; and controlling a reproduction parameter of the reproduction apparatus, wherein the consultation device comprises a local consultation device and a remote consultation device, and the reproduction content comprises a first video source from the remote consultation, a second video source from the local consultation device and a third video source from a hospital digital system, wherein controlling the reproduction parameter of the reproduction apparatus comprising at least one of:

1) Sending, via the local consultation device, a request for the first video source to a control server;

sending, via the control server, the request for the first video source to a media server;

sending, via the media server, the first video source to the reproduction apparatus of the local consultation device; and reproducing the first video source via the reproduction apparatus of the local consultation device;

2) directly reproducing the second video source via the reproduction apparatus of the local consultation device; or 3) sending, via the local consultation device, a request for the third video source to the control server;

sending, via the control server, the request for the third video source to the hospital digital system;

sending, via the hospital digital system, the third video source to the control server; and sending, via the control server, the third video source to the reproduction apparatus of the local consultation device; and reproducing the third video source via the reproduction apparatus of the local consultation device.

* * * * *